(12) United States Patent
Baier et al.

(10) Patent No.: US 12,204,320 B2
(45) Date of Patent: Jan. 21, 2025

(54) ASSIGNING TOOLS TO SPACES IN A TOOL MAGAZINE

(71) Applicant: Siemens Aktiengesellschaft, Munich (DE)

(72) Inventors: Georg Baier, Munich (DE); Silvio Becher, Munich (DE); Lena Hupp, Munich (DE); Christian Royer, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 670 days.

(21) Appl. No.: 17/435,180

(22) PCT Filed: Mar. 1, 2019

(86) PCT No.: PCT/EP2019/055121
§ 371 (c)(1),
(2) Date: Aug. 31, 2021

(87) PCT Pub. No.: WO2020/177836
PCT Pub. Date: Sep. 10, 2020

(65) Prior Publication Data
US 2022/0147024 A1 May 12, 2022

(51) Int. Cl.
*G05B 19/418* (2006.01)
*B23Q 3/155* (2006.01)

(52) U.S. Cl.
CPC ..... *G05B 19/4187* (2013.01); *B23Q 3/15503* (2016.11); *G05B 19/4183* (2013.01)

(58) Field of Classification Search
None
See application file for complete search history.

(56) References Cited

U.S. PATENT DOCUMENTS 6,665,580 B1   12/2003   Susnjara
2007/0293379 A1   12/2007   Feinauer et al.
(Continued)

FOREIGN PATENT DOCUMENTS

CN   202540003 U   11/2012
EP   1870200 A1   12/2017
(Continued)

OTHER PUBLICATIONS

Wang Jie Fa et al; "Research on scheduling and configuration of resource in central tool storage room of numerical control shop"; published: Oct. 23, 2003; vol. 32; No. 5.
(Continued)

*Primary Examiner* — Kenneth M Lo
*Assistant Examiner* — Istiaque Ahmed
(74) *Attorney, Agent, or Firm* — Schmeiser, Olsen & Watts LLP

(57) ABSTRACT

A machine tool which is designed to carry out a specified sequence of work steps is provided. A tool and a processing time is assigned to each work step. A tool magazine is designed to keep a number of tools ready for the machine tool and includes a feeder for conveying tools from and to a transfer point for the machine tool. In a method for assigning tools to spaces of the tool magazine, a number of work steps are determined from the sequence, the respective processing time of each work step being shorter than a specified cycle time of the tool magazine. A work step is iteratively selected from the number of work steps; a previously used tool and a subsequently used tool are assigned spaces of the tool magazine; and the work step is removed from the number of work steps.

13 Claims, 10 Drawing Sheets

(56) References Cited

U.S. PATENT DOCUMENTS

2010/0004107 A1* 1/2010 Amaya ................ B23Q 3/1552
                                                    483/44
2014/0342889 A1  11/2014 Kraft et al.
2015/0248128 A1* 9/2015 Davis ................. B23Q 3/15533
                                                    700/173
2016/0207202 A1* 7/2016 Lee .................. G05B 19/40938

FOREIGN PATENT DOCUMENTS

WO      2012041799 A1    4/2012
WO      2018195572 A2    11/2018

OTHER PUBLICATIONS

PCT International Search Report and Written Opinion of International Searching Authority mailed Nov. 11, 2019 corresponding to PCT International Application No. PCT/EP2019/055121 filed Mar. 1, 2019.

* cited by examiner

| FIG 9A | FIG 9B |

ASSIGNING TOOLS TO SPACES IN A TOOL MAGAZINE

CROSS-REFERENCE TO RELATED APPLICATIONS

This application claims priority to PCT Application No. PCT/EP2019/055121, having a filing date of Mar. 1, 2019, the entire contents both of which are hereby incorporated by reference.

FIELD OF TECHNOLOGY

The following relates to a machine tool having a tool magazine which comprises a feeder. In particular, the following relates to the assignment of tools to spaces of the tool magazine such that the machine tool does not need to wait for the feeder when executing a sequence of predetermined working steps.

BACKGROUND

A machine tool is configured to carry out a predetermined sequence of working steps, wherein each working step is assigned a tool and a processing time. A tool magazine comprises a number of spaces for holding ready a number of tools for the machine tool. A feeder of the machine tool is configured to convey tools between spaces of the tool magazine and a transfer point to the machine tool. The spaces are situated at different distances from the transfer point, such that different spaces necessitate different movement times of an assigned tool.

Whilst the machine tool uses an assigned tool in one working step, the feeder can move a tool of the preceding working step from the transfer point to an assigned space, move to the space of a tool of the subsequent working step, and make the assigned tool available at the transfer point.

In order to determine assignment of tools to spaces, a method has been proposed which performs an optimization by means of mixed-integer programming. It is however not possible with this to process practically occurring problem sizes in an acceptable time.

SUMMARY

An aspect relates to specifying improved technique for assigning tools to spaces of a tool magazine.

The machine tool is configured to carry out a predetermined sequence of working steps, wherein each working step is assigned a tool and a processing time. A tool magazine is configured to hold ready a number of tools for the machine tool in respectively assigned spaces and comprises a feeder for conveying tools from and to a transfer point to the machine tool.

In a method for assigning tools to spaces of the tool magazine, a set of working steps, the processing times of which are in each case shorter than a predetermined cycle time of the tool magazine, is determined from the sequence of working steps. From the set, one working step is iteratively picked out; a tool used in a preceding working step and/or a tool used in a subsequent working step are assigned to spaces of the tool magazine; and the working step is removed from the set. The tools are in each case assigned such that the machine tool does not need to wait for the feeder, or only needs to wait for the feeder for the shortest possible time, upon the transition from the working step to a subsequent working step. Waiting can be avoided if the processing time is longer than a time that the feeder requires to move the tool of the preceding working step from the transfer point to the assigned space, move from there to the space of the tool of the subsequent working step, and subsequently move said tool to the transfer point. Pick-up times and/or placement times of tools can likewise be taken into consideration.

The selection of the working step is performed in accordance with the greedy algorithm such that the assignment of the tools of a step defines in each case a maximum number of traveling operations of the feeder. Subsequently, the working step under consideration is removed from the set. If the set is empty, tools which are still an assigned can be assigned to unassigned spaces of the tool rack.

The method can allow fast and reliable determination of an assignment of tools to spaces of the tool magazine. By means of the iteration in a manner of a greedy algorithm, the method can rapidly converge. The assignment can be determined without extensive trialing of possible solutions, such that the method can be reasonably used for practically encountered problem sizes. If no optimum solution can be determined, then the method can provide an at least partially optimized solution.

The method may be configured for practical use on an industrially used machine tool. The method is carried out by means of a computer and may be implemented in the form of a computer program product (non-transitory computer readable storage medium having instructions, which when executed by a processor, perform actions). The practical applicability of the method has been demonstrated for a sequence with approximately 500 working steps, approximately 100 tools and approximately 250 spaces in the tool magazine. A commercially available workstation computer was capable here of determining an assignment of tools 125 to spaces 135 of the tool magazine 110 within a few seconds. It was possible to obtain similar determination times with the use of approximately 200 and approximately 60 tools.

Instead of working steps, it is possible for critical triplets in the set to be collected, wherein a critical triplet comprises three successive working steps in the case of which the tool of the middle working step is used for a length of time shorter than the duration of a maximum cycle time. During the placement of tools of the triplet, only the tools of the first and of the third working step are assigned to a respective space in the tool magazine. Here, the maximum cycle time is determined is the time that the feeder requires to convey a tool $w_{i-1}$ of a working step $s_{i-1}$ that has been performed from the transfer point to its assigned space $p_{i-1}$, to move from there to the space $p_{i+1}$ of the tool $w_{i+1}$ of an impending working step and to convey the tool $w_{i+1}$ from there to the transfer point. The set initially comprises all triplets of the sequence. From the set, in each case that triplet which has the highest relevance can be picked out. The relevance corresponds to the number of traveling operations of the feeder that are defined by the placement of the first end of the third tool of the triplet.

The relevance is determined only with respect to working steps $s_i$ that are encompassed by a critical triplet $r_i$ of the set M. In this way, the critical triplets $r_i$ can be handled with improved speed. Working steps that are independent of the critical triplets $r_i$ can be handled subsequently.

In a further embodiment, each space is assigned a first time $b_{i1}$, which the feeder requires to convey a tool $w_i$ from the space $p_i$ to the transfer point, and a second time $b_{i2}$, which the feeder requires to convey a tool $w_i$ from the transfer point to the space $p_i$. Here, both times may be taken into consideration in the assignment.

In this way, conveying times of the feeder can be modelled in an improved manner.

A conveying time of a tool between the transfer point and a space is commonly—but not always—dependent on a Euclidean distance between the two locations. The feeder may be subject to a predetermined deceleration during a traveling operation or when accessing a space. For example, the tool magazine may comprise two rack-like arrangements which face toward one another and between which the feeder operates. When accessing a space in one of the racks, a certain expenditure of time may be necessary for a rotational movement of the feeder. Furthermore, for example, the setting-down of a tool in its space may be more time-consuming than the setting-down at the transfer point, for example because more careful maneuvering is necessary in restricted space conditions.

The time b of a space p may also be determined with respect to a tool $w_i$ assigned to the space $p_i$. In this way, it is possible to take into consideration that certain tools must be moved more slowly than others. The influence of a combination of a tool and a space on the required time can be taken into consideration, such that even more realistic modelling is possible.

The assignment of tools is performed such that, thereafter, all unassigned tools can be allocated to an admissible space. It can thus be ensured that a subsequent iteration of the algorithm, that is to say the next step (c), can be carried out. It can thus be effectively ensured that the greedy algorithm achieves complete placement.

To ensure the ability to place all remaining tools, a construct may be created, which may be referred to as guardian, attester or guarantor, and which comprises an admissible assignment of all unassigned tools to free spaces. The guarantor does not constitute a part of the solution; it is created merely in order to substantiate the admissibility of an assignment and can subsequently be discarded.

If the guarantor cannot be formed in a step (c), a created assignment of a tool w to a space p cannot be used. In this case, in step (c), it may be attempted to create another assignment. If all possible assignments have been trialed and if it was not possible to determine the guarantor for any of them, then the method may terminate without success and for example output the empty set.

The guarantor may be determined in a variety of ways. Known forms of determination commonly differ in terms of their complexity and their capability to find a solution, if one exists. These characteristics are commonly contradictory, in that a solution can be found all the more reliably the more complex the determination method is. It is therefore proposed to provide multiple determination methods with different complexities. It is firstly attempted to determine the guarantor by means of the least complex determination method. Only if this fails may the next more complex determination method be used. This procedure can be followed until all determination methods have been trialed. In this way, the complexity the outlay for determining the guarantor can be dynamically adapted such that it can, overall, be carried out in a fast and resource-saving manner.

A first determination method, also referred to as interchanging of spaces, comprises an interchanging of tools that are assigned to spaces in the guarantor. For this purpose, unassigned tools can be assigned in succession to spaces, wherein overlaps are not taken into consideration. Then, placed tools that overlap with adjacent tools (adjacent-space consideration) can be removed from the guarantor and newly assigned. If this is not possible, the interchanging of spaces can be regarded as having failed.

A second determination method comprises an assignment of tools to spaces by means of a best-fit strategy. By contrast to the first determination method, it is possible here for not only mutually overlapping tools but also tools from a predetermined vicinity to be removed from the guarantor and newly assigned. If this is not possible, then the best-fit strategy can also be regarded as having failed.

A third determination method comprises an assignment of tools to spaces by means of a mixed-integer program. Here, a known solver, for example Cplex, may be used to maximize the number of placed tools 125 in the guarantor. If no solution that places all remaining tools can be found here either, then the mixed-integer program can be regarded as having failed.

According to a further aspect of embodiments of the invention, a device for assigning tools w to spaces p in a tool magazine is configured to entirely or partially carry out a method described herein. The device may comprise a programmable microcomputer or microcontroller, and the method may be present in the form of a computer program product with program code means or program code. The computer program product may also be stored on a computer-readable data carrier. Features or advantages of the method are transferable to the device or vice versa.

The device may be configured to control a conveyance of tools which are required for executing the sequence to assigned spaces. Tools already situated in the tool magazine may be correspondingly relocated for this purpose. Furthermore, a tool that has been made available may be newly set down in an assigned space, or a predetermined tool may be removed from the tool magazine.

The device has the following units:
wherein the method comprises the following steps:
  a unit for acquiring a sequence of planned working steps $s_i$ of the machine tool;
299
  tool carries out the working step and a processing time $t_i$, during which the tool $w_i$ is used by the machine tool, wherein, before the working step the feeder conveys the tool $w_i$ from its assigned space $p_i$ in the tool magazine a transfer point,
    where said tool is picked up by the machine tool,
    wherein, after the working step $s_i$, the tool $w_i$ is set down by the machine tool,
    from where said tool is conveyed to its assigned space $p_i$ in the tool magazine by the feeder;
  wherein each space $p_i$ is assigned a time $b_i$ that the feeder requires to convey a tool $w_i$ from the space $p_i$ to the transfer point or vice versa;
characterized by the following steps:
  a unit for determining a maximum cycle time that the feeder requires to convey a tool $w_{i-1}$ of a working step $s_{i-1}$ that has been performed from the transfer point to its assigned space $p_{i-1}$, to move from there to the space $p_{i+1}$ of the tool $w_{i+1}$ of an impending working step $s_{i+1}$, and to convey the tool $w_{i+1}$ from there to the transfer point;
  a unit for determining a set M with all triplets $r_i$ of successive working steps $s_{i-1}$, $s_i$, $s_{i+1}$, in the case of which the processing time $t_i$ of the working step $s_i$ is shorter than the maximum cycle time; units for carrying out the following steps (a), (b), (c), (d):
  (a) determining relevances of the triplet $r_i$ of the set M, wherein the relevance of a triplet $r_i$ comprises a number of movements or conveying actions that are defined as the tool $w_{i-1}$ is assigned to a space $p_{i-1}$ and the tool $w_{i+1}$ is assigned to a space $p_{i+1}$;

(b) determining a triplet of the set M with the highest relevance;

(c) assigning the tool $w_1$ of the determined triplet to a space $p_1$ and/or the tool $w_3$ to a space $p_3$ such that the processing time $t_2$ is longer than, or is shorter to the least possible extent than, the sum of the times required for conveying the tool $w_1$ from the transfer point to the space $p_1$, for moving the feeder from there to the space $p_3$ and for conveying the tool $w_3$ from there to the transfer point;

(d) removing the determined triplet from the set M;

a unit for repeating steps (a) to (d) until the set M is empty; and a unit assigning unassigned tools $w_i$ to unassigned spaces $p_i$ of the tool magazine.

The units in the following exemplary embodiment are not explicitly illustrated in the figures. They may be implemented in the form of hardware and/or in the form of software and/or in the form of firmware. It is possible for the respective units to be integrated with one another into one unit. Said unit may then be a processing unit of the device, for example in the form of a processor.

A system according to embodiments of the invention comprises a machine tool and a device described herein, wherein the device is configured to control the machine tool in order to carry out the working steps of the sequence.

BRIEF DESCRIPTION

Some of the embodiments will be described in detail, with reference to the following figures, wherein like designations denote like members, wherein.

DETAILED DESCRIPTION

Figure 1:
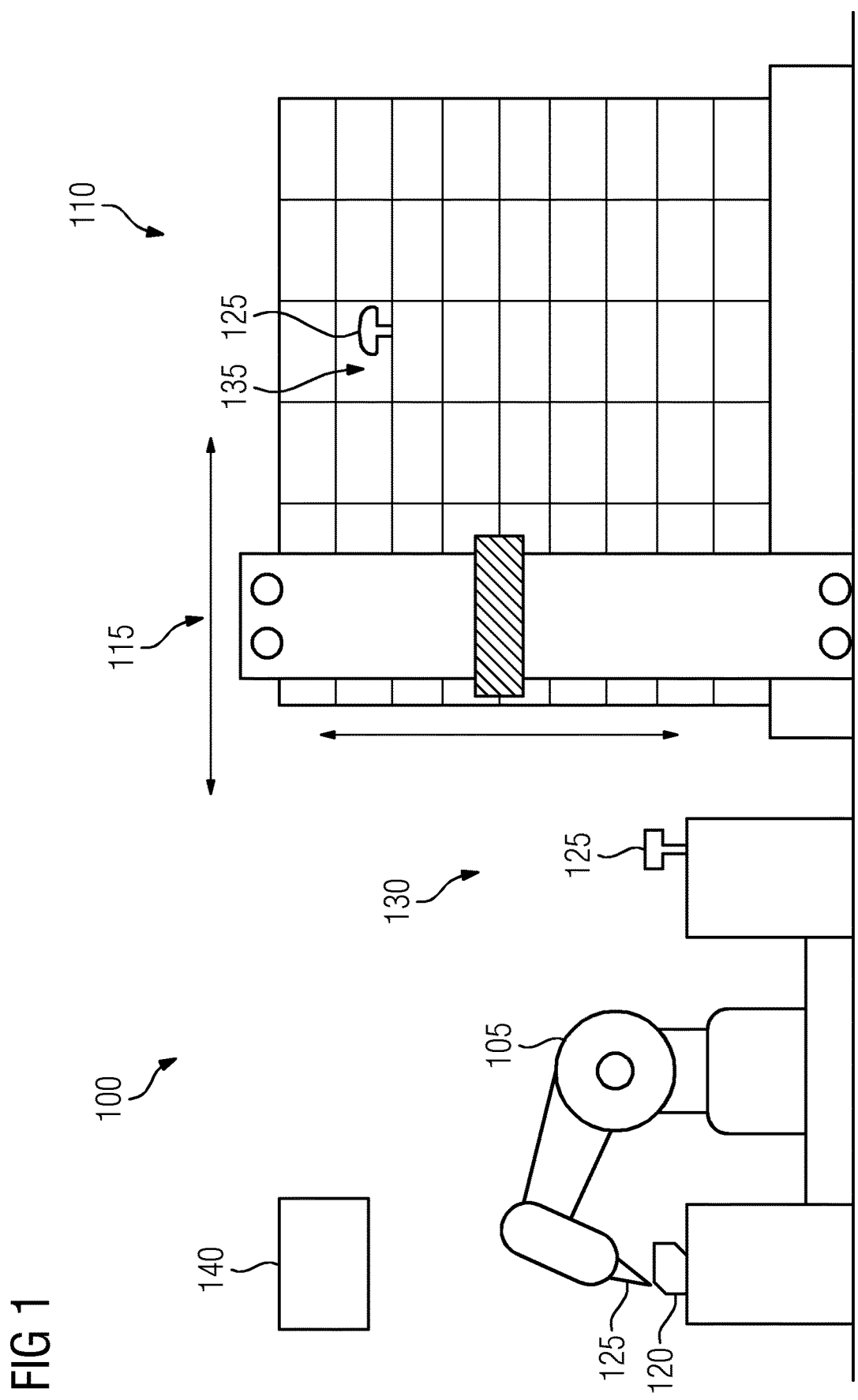
FIG. 1 shows a system having a machine tool and a tool magazine.

FIG. 1 shows a system 100 which comprises a machine tool 105 and a tool magazine 110 with a feeder 115. The machine tool 105 is configured to carry out a sequence of working steps in order to process a workpiece 120. Here, a working step comprises the pick-up of an assigned tool 125 at a transfer point 130, the use of the tool 125, and the setting-down of tool 125 at the transfer point.

If a tool 125 has been set down at the transfer point 130, the feeder 115 conveys said tool to an assigned space 135 in the tool magazine 110. From there, the feeder 115 moves to a space 135 which is assigned to a tool 125 of an impending working step and conveys the required tool 125 to the transfer point 130, where the machine tool 105 can pick up said tool as soon as said machine tool has set down a presently used tool. A conveying time of a tool is commonly longer the greater a distance is for the feeder 115 between the space 135 and the transfer point 130. Further influences, for example a movement that has to be performed by the feeder 115 or a time required for a picking-up or setting-down operation, may be taken into consideration. An influence may be dependent on the space 135, on the tool 125 or on a combination of both.

The machine tool 105 is an NC or CNC machine which can be used for example for turning, drilling, milling, knurling or some other form of automatable processing, for example soldering, welding or spraying. The workpiece 120 commonly comprises metal, though may also comprise, for example, wood, ceramic or plastic. In one embodiment, the tool 120 may be movable relative to the machine tool 105, either by means of a conveying system, for example in the form of a conveyor belt, or by means of a movable holding device. The machine tool 105 is commonly designed to be positionally fixed or fixed relative to the tool magazine 110.

The tool magazine 110 comprises a multiplicity of spaces 135, into each of which a tool 125 can be placed. Commonly, all spaces 135 are of equal size and can each receive exactly one tool 125. It is also possible for differently sized spaces 135 to be provided for receiving differently sized tools 125, wherein a small tool 125 can be placed in a large space 135 but a large tool 125 cannot be placed in a small space 135. A tool 125 may also occupy more than one space 135, for example because it partially projects into a volume of an adjacent space 135. The spaces 135 may also have different load-bearing capacities, such that a tool 125 can be placed only in a space 135 that offers at least this load-bearing capability. Also, a sum of the loads of multiple tools 125 across multiple predetermined spaces 135 may be limited. Furthermore, it may be specified that the total mass of the tools placed into the spaces 135 of the tool magazine 110 collectively must not exceed a predetermined value of, for example, approximately 250 kg.

The tool magazine is, as illustrated, configured in the form of a rack, wherein multiple racks each with multiple spaces 135 may be situated opposite one another in relation to the feeder 115.

A space 135 is assigned a conveying time that is required for a tool 125 to be picked up from the space 135 by the feeder 115, conveyed to the transfer point 130, and set down. The conveying time in the opposite direction is commonly the same. In some embodiments, the conveying times in different directions differ from one another; in particular, in the case of one tool magazine 110, it was possible to observe that a conveying time of a tool 125 from a space 135 to the transfer point 130 was systematically shorter than that in the opposite direction. In this case, the setting-down of the tool 125 took longer, on average, at the space 125 than at the transfer point 130.

The spaces are commonly assigned conveying times of different length, wherein a short Euclidean distance of a space 135 to the transfer point 130 can be assigned to a short conveying time, and a large Euclidean distance of the space 135 to the transfer point 130 can be assigned to a long conveying time. If multiple racks are present, access to one of the racks may require a rotation of the feeder about a vertical axis, wherein they are conveying time may include a time required for this.

The conveying time of a space 135 might also apply to a tool 125 assigned to said space. If the conveying of different tools 125 is subject to different factors, then the conveying times of the tools may be dependent not only on a space but also on a tool 125 assigned to said space. For example, a picking-up or setting-down process may take different lengths of time for different tools 125, or a maximum conveying speed may be different for different tools 125.

For the sake of simplicity, the transfer point 130 is assumed to be a single location at which two tools 125 can be set down simultaneously at least briefly. In practice, it may also involve two locations, which are commonly situated close together, or a changeover device, which comprises two locations each for receiving one tool, which locations can be interchanged with one another. The transfer point 130 may be configured as a device, such that a tool 125 can rest at the transfer point 130 even without the machine tool 105 or the feeder 115 of the tool magazine 110. The transfer point 130 may also be defined as a location in space at which the machine tool 105 and the feeder 115 can transfer a tool 125 to one another.

After the setting-down of a tool 125 by the machine tool 105, the feeder requires a certain length of time in order to pick up the tool 125 at the transfer point 130, move said tool back to its space 135 in the tool magazine 110, move to the space 135 of a subsequent tool 125, and move said tool 125 to the transfer point 130. This time is referred to as cycle time and is generally dependent on the spaces 135 and possibly on the assigned tools 125. A maximum cycle time indicates how long the cycle time may be for an arbitrary combination of spaces 135 and tools 125. If all tools 125 can be picked up, conveyed and set down equally quickly, than the maximum cycle time is commonly an invariant value for a given tool magazine 110.

In order to avoid a waiting time of the machine tool 105, the cycle time must be shorter than the processing time of the machine tool 105 with the tool 125 that said machine tool requires after the setting-down of the most recent tool 125. In other words, the processing time of a working step of the sequence of working steps should always be longer than the cycle time with respect to a previously and a subsequently used tool 125. In order that this is ensured even in the case of short processing times, it is proposed that the tools 125 be assigned to spaces 135 of the tool magazine 110 such that tools 125 that are used before or after a working step with a short processing time are set down in spaces 135 with conveying times that are short enough that all cycle times of working steps of the sequence are shorter than the assigned processing times. If this aim cannot be achieved, then the cycle times of the working steps should be longer to the least possible extent than the assigned processing times. Altogether, waiting times of the machine tool 105 in executing the sequence should be kept as short as possible and ideally avoided entirely.

In practice, the average processing times of a sequence are commonly longer than the average cycle times thereof. It may suffice to optimize only cycle times which arise during processing times that are shorter than or equal to the maximum cycle time. For all other working steps, the processing time is in any case greater than the cycle time, such that no waiting time can occur irrespective of conveying times from or to spaces 135 that are involved.

A device 140 is provided which is configured to carry out an assignment of tools 125 to spaces 135 of the tool magazine 110 in the manner proposed herein. Here, the device 140 comprises a programmable microcomputer or microcontroller or a combination of several such devices. The device 140 may be part of a planning system that provides the sequence. The device 140 need not necessarily be arranged locally with respect to the machine tool 105 or the tool magazine 110. The device 140 may for example also be implemented as a server or service which is contactable via a network. In particular, the device 140 may be implemented as a functionality in a cloud.

The device 140 may be configured to control the machine tool 105. The control may relate in particular to the execution of the working steps of the sequence. The control may also relate to a setting-up of the tool magazine 110. The setting-up may comprise a movement of a tool 125 which has already been placed in the tool magazine 110 from one space 135 to an assigned space 135. The setting-up may also comprise the sorting of an additional tool 125 into an assigned space 135. The additional tool 125 may for example be received from the feeder 115 at a dedicated transfer point. The setting-up may also comprise a removal of a tool 125 from tool magazine 110. Here, the removed tool 125 may for example be made available at the transfer point 130.

Figure 2:
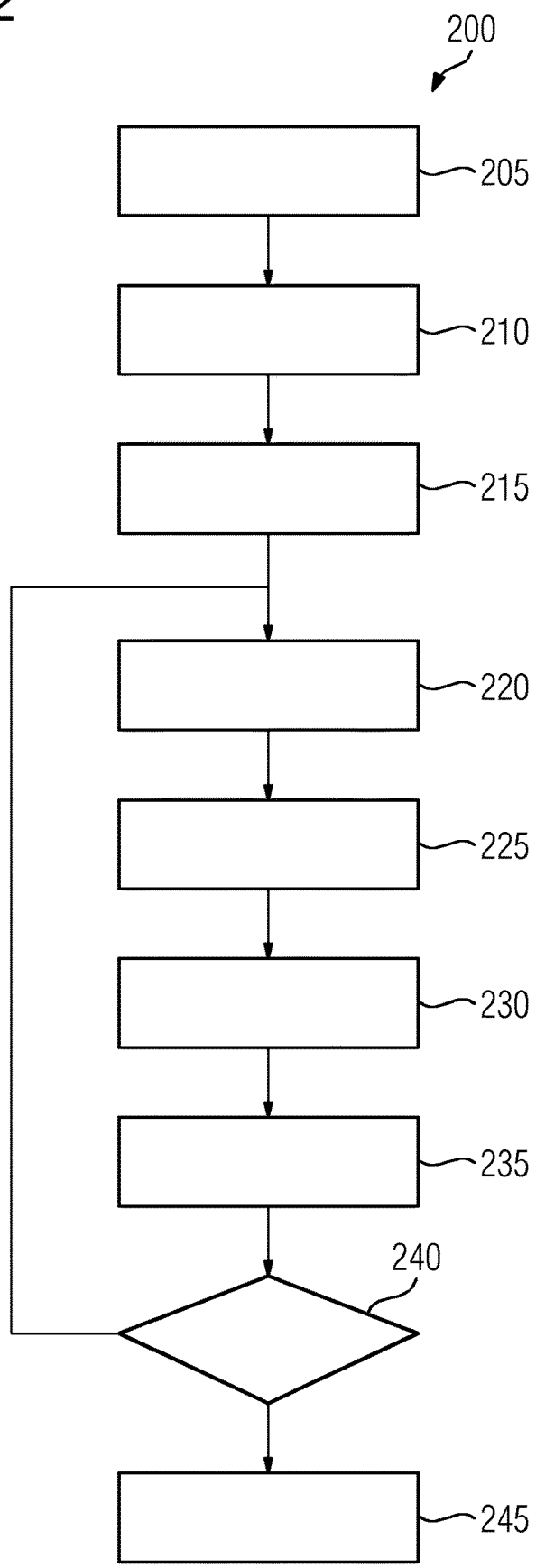
FIG. 2 shows a flow diagram of a method for assigning tools of a machine tool to spaces of a tool magazine.

FIG. 2 shows a flow diagram of an exemplary method 200 for assigning tools 125 to spaces 135 of a tool magazine 110, of the type shown in FIG. 1. The aim of the method 200 is an assignment that avoids a waiting time of the machine tool 105 during the execution of a predetermined sequence S of working steps s.

In a step 205, the sequence S of working steps s is acquired. With regard to a technique presented herein, the sequence S is handled as an input provided from an external entity. Each working step f is assigned a tool 125 and a processing time t, which, here, are likewise assumed to be known. The working steps s have a predetermined order within the sequence S and, for easier referencing, can be denoted by indices that reflect the order in accordance with the natural numbers. Tools w, spaces p and times t each bear the index of the assigned working step s.

A working step $s_i$ has a preceding working step $s_{i-1}$ and a subsequent working step $s_{i+1}$. It is thus possible, for example, to easily express that, while a working step $s_i$ is being performed during the operation of the system 100, the feeder 115 can convey the tool $w_{i-1}$ of the preceding working step $s_{i-1}$ from the transfer point 130 to the assigned space $p_{i-1}$, move from their to its predetermined space $p_{i+1}$, and convey an assigned tool $w_{i+1}$ from there to the transfer point 130. The tool $w_{i-1}$ used in the preceding working step $s_{i-1}$ can also be referred to as tool 125 to be put away, that which is used in the working step $s_i$ can be referred to as present tool 125, and/or that which is used in the subsequent working step $s_{i+1}$ can be referred to as tool $w_{i+1}$ to be procured.

In a step 210, a maximum cycle time can be determined. The maximum cycle time may be an invariant of the tool magazine 110, or may be determined with respect to tools $w_i$–$w_n$ included by the steps 1-n of the sequence S. Here, it is the case that a pessimistic determination is carried out, for example through the determination of a cycle time that arises if two tools 125 of the sequence S that take the greatest amount of time to transport are assigned to spaces 135 with maximum distances to the transfer point 130 and with distances to one another that are maximized to the greatest possible extent.

In a step 215, a set M of critical triplets r is determined. A triplet $r_i$ comprises a sequence of three successive working steps $s_{i-1}$, $s_i$, $s_{i+1}$, in the sequence S. A triplet $r_i$ is critical if the processing time $t_i$ of the middle working step $s_i$ is shorter than the maximum cycle time.

In a step 220, a relevance is determined for each triplet $r_i$ in the set M. The relevance of a triplet $r_i$ is measured from how many traveling operations of the feeder 115 are defined when the tool $w_{i-1}$ and the tool $w_{i+1}$ are assigned to a respective space 135. Here, traveling operations that are considered include every conveying action or movement of the feeder 115 which begins and/or ends at one of the spaces 135 and is part of a critical triplet r of the set M. Each critical triplet $r_j$ of the set M can thus contribute at most three counters to the relevance of the triplet $r_i$: one for a conveyance of a tool 125 from the transfer point 130 to the space $p_{j-1}$, one for a movement of the empty feeder 115 from the space $p_{j-1}$ to the space $p_{j+1}$, and one for a conveyance of a tool 125 from the space $p_{j+1}$ to the transfer point 130.

In other words, the relevance of a triplet $r_i$ from the set M can be determined as follows:
- number $r_j$ with $w_{j-1}=w_{i-1}$ AND $w_{i-1}$ not yet placed+
- number $r_j$ with $w_{j-1}=w_{i+1}$ AND $w_{i+1}$ not yet placed+
- number $r_j$ with $w_{j+1}=w_{i-1}$ AND $w_{i-1}$ not yet placed+
- number $r_j$ with $w_{j+1}=w_{i+1}$ AND $w_{i+1}$ not yet placed+
- number $r_j$ with $w_{i-1}=w_{i-1}$ AND $w_{j+1}=w_{i+1}$ AND $w_{i-1}$, $w_{i+1}$ not yet placed AND NOT $w_{i-1}=w_{i+1}$+
- number $r_j$ with $w_{j-1}=w_{i-1}$ AND $w_{i-1}$ not yet placed AND $w_{j-1}$ placed+
- number $r_j$ with $w_{j-1}=w_{i+1}$ AND $w_{i+1}$ not yet placed AND $w_{j+1}$ placed+
- number $r_j$ with $w_{j+1}=w_{i-1}$ AND $w_{i-1}$ not yet placed AND $w_{j-1}$ placed+
- number $r_j$ with $w_{j+1}=w_{i+1}$ AND $w_{i+1}$ not yet placed AND $w_{j-1}$ placed.

In a step 225, a critical triplet r of the set M with the highest relevance is determined. If several triplets r have the same, maximum relevance, then one of the triplets r may be selected arbitrarily. Hereinafter, $r_i$ is the selected critical triplet.

In a step 230, the tool $w_{i-1}$ is assigned a space $p_{i-1}$ and the tool $w_{i+1}$ is assigned a space $p_{i+1}$ such that the machine tool 105 has as short a waiting time as possible, and ideally no waiting time whatsoever, upon the transition from the working step $s_i$ to the working step $s_{i+1}$, that is to say the cycle time of the critical triplet $r_i$ is shorter than the processing time $t_i$. If one of the tools $w_{i-1}$, $w_{i+1}$ has already been assigned a space 135, then only the respective other is newly assigned. Boundary conditions for the placement of the tools $w_{i-1}$, $w_{i+1}$ in the tool magazine 110 are observed in the assignment, for example an overlap of a tool 125 of an assigned space 135 with an adjacent space 135, or a weight restriction of a space 135. For this purpose, different space types may be predetermined, to which in each case one or multiple spaces 135 are assigned. A predetermined tool 125 may then be assigned only to a space 135 for whose space type it is suitable. In a further embodiment, a space 135 of the tool magazine 110 may also be blocked. It is no longer possible for a tool 125 to be assigned to said space 135. A content of the space 135 also cannot be removed or transported to another location.

As described above, the cycle time of the triplet $r_i$ comprises the total time that the feeder 110 requires to convey the tool $w_{i-1}$ from the transfer point 132 of its assigned space $p_{i-1}$; to move from there to a space $p_{i+1}$ which is assigned to the tool $w_{i+1}$; and to convey the tool $w_{i+1}$ from there to the transfer point 130.

If it is not possible to find spaces $p_{i-1}$ and $p_{i+1}$ to which the tools $w_{i-1}$, $w_{i+1}$ can be assigned, the method 200 may be terminated. This may be the case for example if one of the remaining tools $w_{i-1}$, $w_{i+1}$ is too large for all of the spaces 135 that are still free. In this case, the method 200 may output the empty set in order to indicate that it was not possible to find any suitable solution.

A critical triplet $r_i$, the tools $w_{i-1}$ and $w_{i+1}$ of which are respectively assigned to a space 135, may make no further contribution to the determination of the relevance of a critical triplet r. The most recently selected triplet $r_i$ is thus removed from the set M in a step 235.

In a step 240, it may be checked whether the set M still contains triplets $r_i$. If this is the case, then the method 200 may continue with the step 220 and perform a further iteration. Otherwise, the iteration may be ended.

The iteration of the steps 220-240 is, in the selection of a triplet $r_i$, the tools $w_{i-1}$ and $w_{i+1}$ of which are assigned to spaces 135, directed to a maximum effect to be achieved. The method 200 thus operates in the manner of a greedy algorithm.

In a step 245, it is finally possible for unassigned spaces 135 and unassigned tools 125 to be assigned to one another. The assignment is normally not critical, because it can be ensured that no waiting time of the tool 105 can result from the assignment. To minimize traveling distances of the feeder 115, a heuristic may be used which selects spaces 135 with short conveying times and in particular a short distance to the transfer point 130.

Figure 3:
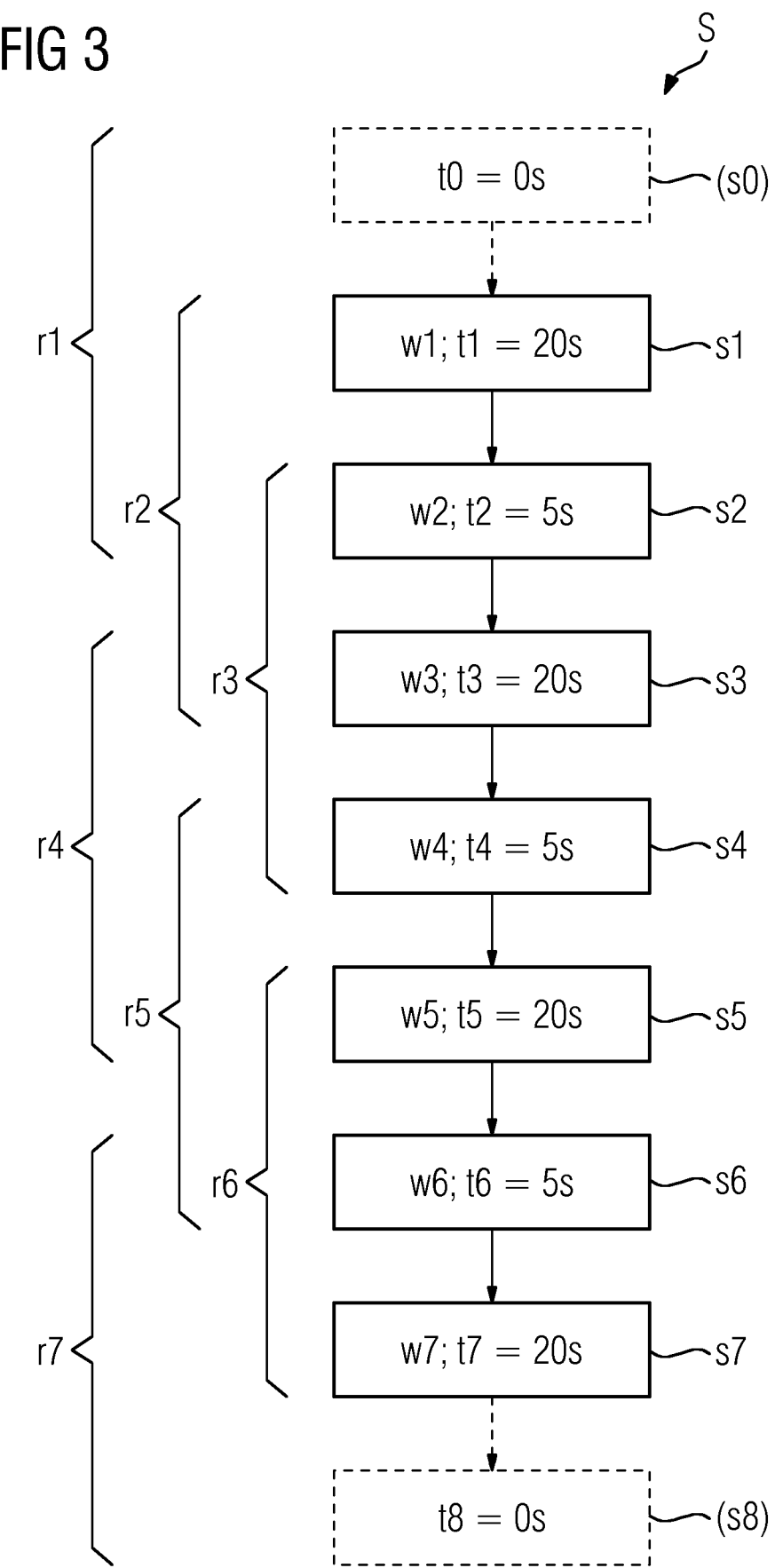
FIG. 3 shows an exemplary sequence of working steps of a machine tool.

FIG. 3 shows an exemplary sequence S, on the basis of which the method 200 will be run through by way of example below.

The sequence S comprises steps $s_1$-$s_7$, each of which is assigned a tool $w_1$-$w_7$ and a processing time $t_1$-$t_7$. From these, triplets $r_2$ to $r_6$ can be formed. The first working step $s_1$ has no preceding working step and the final working step $s_7$ has no subsequent working step, such that, strictly speaking, no triplets $r_1$ or $r_7$ can be formed. For easier handling, "empty" working steps $s_0$ and/or $s_8$ can be assumed, which are each assigned no tool 125 and the processing time t of which is zero.

A maximum cycle time of the tool magazine 110 is, in this example, 18s. Of the seven possible triplets r, it is thus the case that only three are critical, specifically $r_2$, $r_4$ and $r_6$, the processing times of which (in each case 5s) fall below the maximum cycle time (18s). The set M contains the three triplets $r_2$, $r_4$ and $r_6$.

First Iteration:

The first critical triplet $r_2$ relates to movements of the feeder with respect to the tools $w_1$ and $w_3$. The relevance of the first critical triplet $r_2$ is determined as being 4 (in the tables below, TP stands for the transfer point 130):

| Triplet | Conveyance | Movement | Traveling operations |
|---|---|---|---|
| r2 | w1 from TP to p1; w3 from p3 to TP | p1 to p3 | 3 |
| r4 | w3 from TP to p3 | — | 1 |
| r6 | — | — | 0 |

The second critical triplet $r_4$ relates to movements of the feeder with respect to the tools $w_3$ and $w_5$. The relevance of the second critical triplet $r_4$ is 5:

| Triplet | Conveyance | Movement | Traveling operations |
|---------|------------|----------|----------------------|
| r2 | w3 from p3 to TP | — | 1 |
| r4 | w5 from p5 to TP; w3 from TP to p3; | p3 to p5 | 3 |
| r6 | w5 from TP to p5 | — | 1 |

The third critical triplet $r_6$ relates to movements of the feeder with respect to the tools $w_5$ and $w_7$. The relevance of the third critical triplet $r_6$ is 4:

| Triplet | Conveyance | Movement | Traveling operations |
|---------|------------|----------|----------------------|
| r2 | — | — | — |
| r4 | w5 from p5 to TP; | — | 1 |
| r6 | w5 from TP to p5; w7 from p7 to TP | p5 to p7 | 3 |

The critical triplet r with the highest relevance is $r_4$, that is to say the tools $w_3$ and $w_5$ are respectively assigned a space 135 such that, during the execution of $r_4$, there is as short as possible a waiting time, ideally no waiting time whatsoever, for the machine tool 105. For example, the tools $w_3$ and $w_5$ may be placed at the two spaces $p_3$ and $p_5$ with the shortest distance to the transfer point 135. After the assignment, the second triplet $r_4$ is removed from the set M.

Second Iteration:

The relevance of the first critical triplet $r_2$ is 2:

| Triplet | Conveyance | Movement | Traveling operations |
|---------|------------|----------|----------------------|
| r2 | w1 from TP to p1 | p1 to p3 | 2 |
| r4 | — | — | 0 |
| r6 | — | — | 0 |

The relevance of the third critical triplet $r_6$ is 2:

| Triplet | Conveyance | Movement | Traveling operations |
|---------|------------|----------|----------------------|
| r2 | — | — | — |
| r4 | — | — | — |
| r6 | w5 from TP to p5 | p5 to p7 | 2 |

Since both triplets $r_2$ and $r_6$ have equal relevance, one of these is selected arbitrarily, in the present case $r_2$. The tools $w_1$ and $w_3$ are placed in the tool magazine 110 such that, during the execution of $r_2$, there is the shortest possible waiting time, ideally no waiting time whatsoever, for the machine tool 105. The tools $w_1$ and $w_3$ are placed in spaces $p_1$, $p_3$ close to the transfer point 130. Spaces $p_1$, $p_3$ are selected which are situated close together, so as to also minimize the duration of the empty traveling movement from $p_1$ to $p_3$. The duration of an empty traveling movement between two spaces 135 may for example be empirically determined and assigned to one or both spaces 135. Alternatively, the duration of the empty traveling movement may be determined by way of an algorithm on the basis of absolute or relative coordinates of the spaces 135.

After the assignment, the first triplet $r_2$ is removed from the set M, such that only the third triplet $r_3$ remains in the set M. This automatically has the highest relevance, such that the tools $w_5$ and $w_7$ assigned thereto are placed before the iterations end.

It is then the case that all tools 125 that relate to at least one critical triplet r are assigned to a respective space 135. Remaining tools $w_2$, $w_4$ and $w_6$ can then be assigned arbitrarily to spaces 135 that are still free.

Detailed Description of the Space Allocation

In the step 215, the set M of all critical triplets $r_i$ is determined.

In accordance with a relevance function, the triplets with the highest relevance are successively selected and placed in the tool magazine 110. Here, the set M and the relevance function changes after every placement. The algorithm terminates when the set M is empty, or if no space has been found for a selected triplet $r_i$.

This approach can be written as follows in pseudocode:

```
Input: S // sequence of working steps
Output: assignment of tools 125, which are assigned to the working steps S, to spaces 135
// initialize
M <- initializeToolSwaps(S)
// greedy place tool-swaps
while success AND (M ≠ Ø) do
    // determine tool exchange with the highest relevance
    r <- arg max_{r∈M} rel (r)
    // place highest relevance tool swap
    success, placement <- place (placement, r)
    // update set of tool swaps
    M <- updateToolSwaps (placement, S)
end
if success then
    return placement
end
// no feasible placement found
return Ø
```

Greedy Selection Function

The selection function $$\arg\max_{r \in M} \text{rel}(r)$$

should give precedence to the critical triplets in the case of which the placement of the tools 125 has the greatest possible influence on the overall waiting time. In other words, the space allocation to the one or more tools 125 of the triplet that have not yet been placed results in the definition of the cycle times for the greatest possible number of additional critical triplets r. Here, only placements of the tools w to be moved are taken into consideration.

For a critical triplet $r=(w_1, w_2, w_3)$, let it be assumed that $$\hat{r} = \{w_1, w_3\}$$

is the set of the tools 125 to be moved; and $$\bar{r} = \{w \in \hat{r} | w \text{ not yet placed}\}$$

is the set of those tools of r to be moved which have not yet been placed. The relevance rel(r) is determined as a sum of weights $$\text{ref}(r) = \Sigma \text{hd } r' \in M \wedge \hat{r}' \cap \bar{r} \neq \emptyset \text{ weight}_{M,S}(r')$$

across all critical triplets $r'=(w_1', w_2', w_3')$ which, with $\bar{r}$, share one or two common tools 125 to be moved. Here, the weight $\text{weight}_{M,S}(r')$ is the weighted frequency with which the tool change r' occurs in the sequence S of the working steps as a critical triplet. The weighting of r' is three if $|\hat{r}' \cap \bar{r}|=2$.

Otherwise, r and r' share exactly one common tool 125 to be moved. In this case, the weighting for r' is two for $|\overrightarrow{r'}|=1$, and otherwise, $|\overrightarrow{r'}|=2$, is one.

In other words:

weight$_{M,S}$(r')=number of newly defined movements, relating to r', of the feeder 115 (putting-away of $w_1'$; empty travelling movement from $p_1$ to $p_3$; and fetching of $w_3'$) if the tools $w_1$ and $w_3$ of r were placed in the tool magazine 110. Multiplied by the frequency with which the tool change $w_1$, $w_3$ occurs in the sequence S as a critical triplet.

FIGS. 4-7 each show an illustration of a further example for explaining the selection of a triplet r from the set M. Five tools A, B, C, D and E are provided. If two tools A-E are linked to one another by an arrow, then the tools $w_1$ and $w_3$ to be moved form a critical triplet r together with a further tool $w_2$ (not illustrated). The arrow leads away from the tool A-E that is to be put away and ends at the tool A-E that is to be fetched. Altogether, seven critical triplets r are illustrated. Tools 125 that are not encompassed by a critical triplet r are not illustrated in FIG. 4. Tools A-E to which spaces 135 are already allocated are illustrated by circles; tools A-E that have not yet been assigned are illustrated by rounded squares.

For the explanation of FIGS. 4-10, for a triplet $r=(w_{i-1}, w_i, w_{i+1})$, a notation in the form r=(A, B) is used in the case of which only the tool $A=w_{i-1}$ that is to be put away and the tool $B=w_{i+1}$ that is to be fetched are presented. The tool $w_i$ that is used during the movements is not mentioned.

Figure 4:
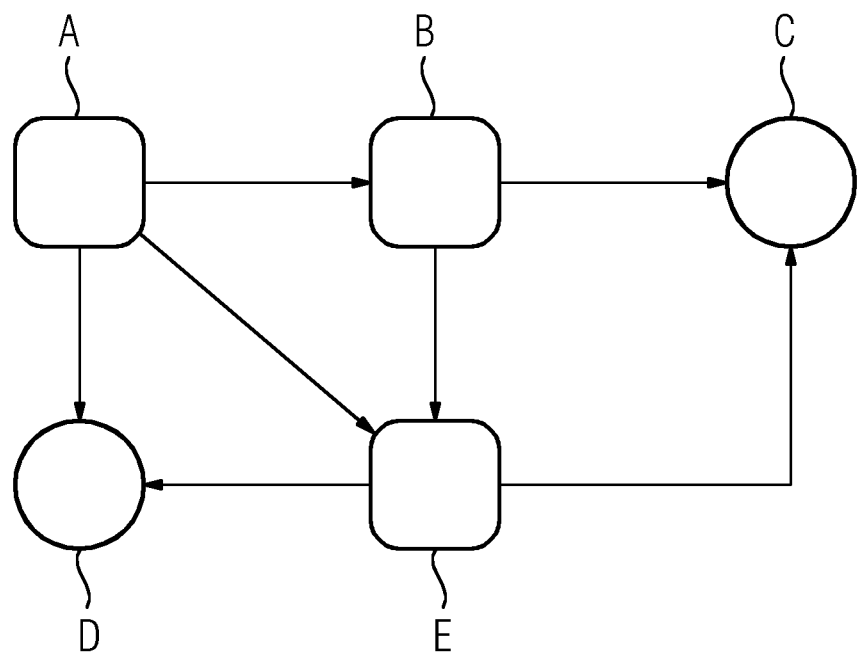
FIG. 4 shows an exemplary selection of tools to be placed.

In the situation of FIG. 4, there are still seven critical triplets r in the case of which at least one tool w has still to be placed: (A, B); (A, D); (A, E); (B, C); (B, E); (E, C) and (E, D).

Figure 5:
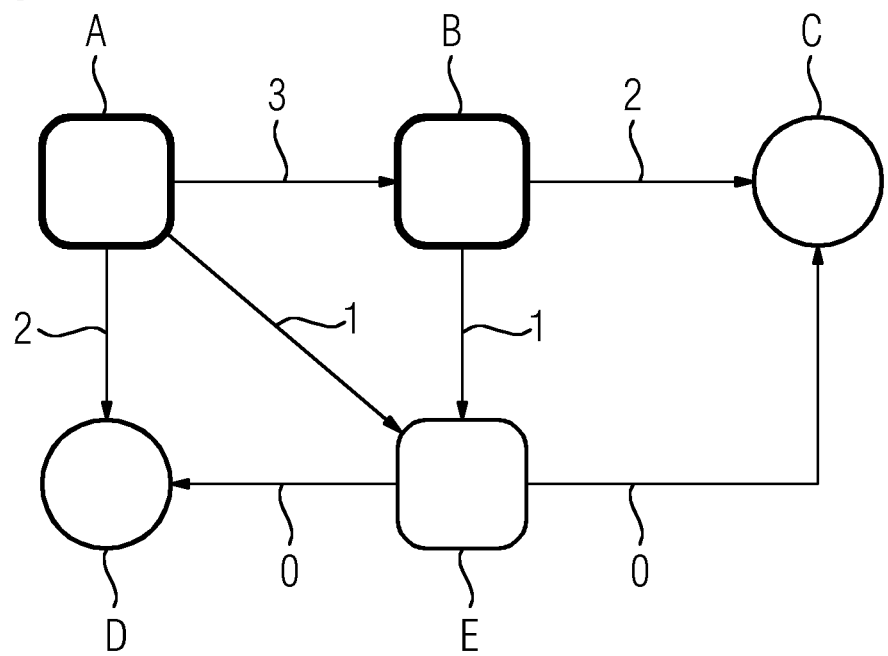
FIG. 5 shows an exemplary selection of tools to be placed.
Figure 6:
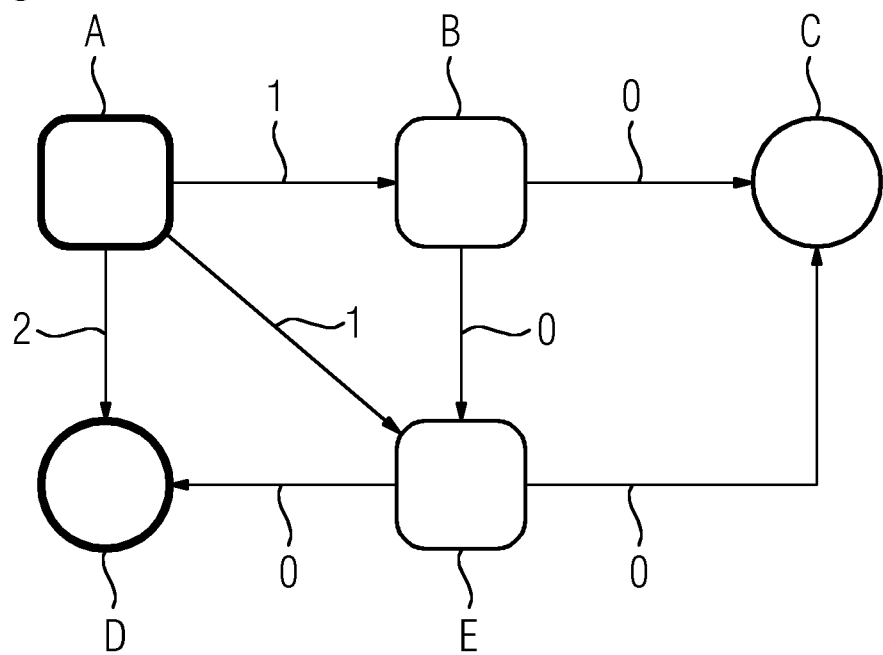
FIG. 6 shows an exemplary selection of tools to be placed.
Figure 7:
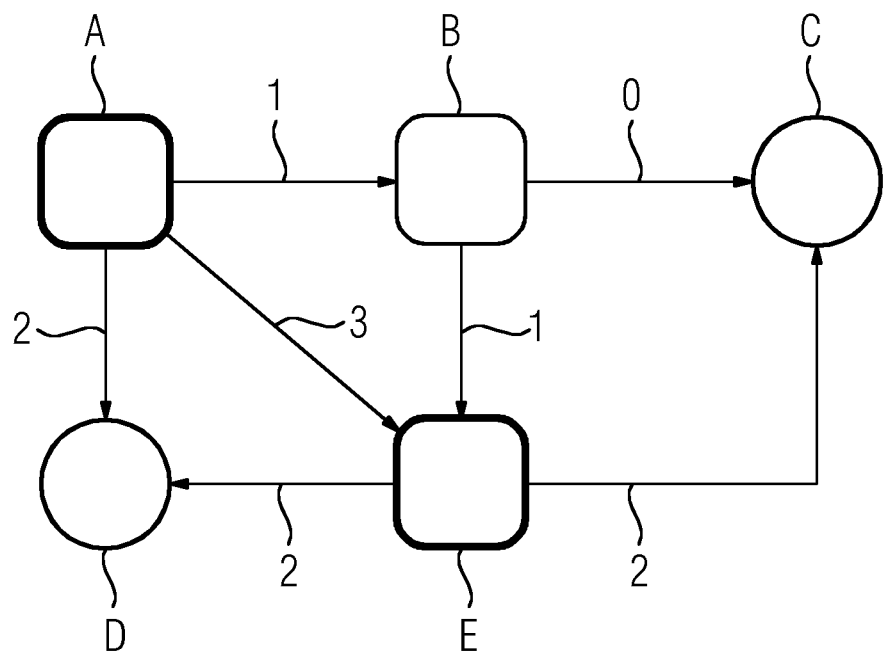
FIG. 7 shows an exemplary selection of tools to be placed.

In FIGS. 5 to 7, for the triplets (A, B); (A, D) and (A, E) comprising the tool A, the weightings of the tool triplets for the determination of the relevances rel(A, B); rel(A, D) and rel(A, E) are illustrated on the arrows. If all tool triplets occur exactly once, then the following relevances arise: rel(A, B)=9; rel(A, D)=4; rel(A, E)=11. The triplet (A, E) thus has the highest relevance.

If, however, the triplet (A, B) arises five times and all others arise only once, then the following relevances arise: rel(A, B)=21; rel(A, D)=8; rel(A, E)=15. Here, the triplet (A, B) has the highest relevance.

Placement

The assignment (or: placement)

place(placement, r)

of a tool triplet $r=(w_{i-1}, w_i, w_{i+1})$ to or in spaces 135 may be performed in accordance with an estimation of the waiting time for the feeder 115 that arises as a result of the assignment. At least one of the tools $w_{i-1}$, $w_{i+1}$ of the triplet r has not yet been placed, such that one or two spaces 135 have to be selected. Since the selection of only one space 135 is a simple special case, two spaces $p_{i-1}$ and $p_{i+1}$ which are to be selected for the tools $w_{i-1}$ and $w_{i+1}$ of a triplet will be taken as a starting point by way of example below.

Only spaces 135 that can receive the tools $\bar{r}$ to be placed are to be evaluated. The tools 125 must in each case be admissible for the spaces 135 and, in a present occupancy of spaces 135 of the tool magazine 110, there must be sufficient space available for the tools 125 which are to be placed. For this purpose, it is possible in each case for spaces 135 adjacent to a space 135 to be jointly considered (adjacent-space consideration). A total load of the tool magazine 110 may also be taken into consideration.

Since the two tools 125 to be placed need not be identical in terms of their dimensions and restrictions, considered space pairs are ordered here and comprise the spaces $p_{i-1}$ and $p_{i+1}$. The space pair that results in the shortest waiting time for the partial occupancy, expanded to include this assignment, of the tool magazine 110 is selected. Instead of estimating the waiting time, it is possible to determine and add up the total times for the critical tool changes that overlap with r:

$$\{r' \in M | \hat{r}' \cap \bar{r} \neq \emptyset\}$$

For all fully placed critical tool triplets, the exact exchange time can be determined. From the rest of the critical tool triplets, those which have not been fully placed, only those parts of the total exchange time which are terminated by the newly placed tools $\bar{r}$ are added up, that is to say the traveling time with the tool from space 135 to transfer point 130 and vice versa. The space pair with the shortest total exchange time is selected.

Referring again to FIG. 5, it is the intention to find spaces 135 for the tools A and B. That is to say, during the space selection, the tools A and B are likewise considered as having been placed. The tool triplets (A, B), (A, D) and (B, C) have thus been fully placed, and the exchange time thereof can be calculated if the spaces for A and B have been selected. For the partially placed triplets (A, E) and (B, E), only the times for the putting-away of A and the fetching of B can be calculated. The triplets (D, E) and (E, C) have no relationship with the triplet (A, B) to be placed, and are not considered.

Improvement of the Selection

The described space allocation heuristic already leads to very good results. In some cases, however, tools 125 with low potential for waiting time saving are placed at a time before tools 125 with a high savings potential. Both the selection function and in the space selection, all critical tool triplets r are considered as being equivalent. In this way, tool triplets r with low savings potential can be overvalued in the relevance function and/or in the space selection.

In order to distinguish tool triplets r with high and low savings potential with respect to one another, we will, in one embodiment, define a tool triplet ($w_{i-1}$, $w_i$, $w_{i+1}$) as α-critical if the processing time t of the tool $w_i$ is shorter than the sum of a and the minimum cycle time of the critical tool triplets r that have not yet been fully placed.

The space allocation heuristic can update the set M of the critical tool triplets r in every iteration. This set M can be replaced by the set of α-critical tool triplets r. Here, α is selected in accordance with the interval between minimum and maximum cycle time of the tool magazine 110. For the tool magazine 110 considered by way of example, a value of approximately 3 seconds for it a has proven expedient.

Resource Limitations

The space allocation heuristic allocates tools 125 from critical triplets r the magazine spaces 135 in succession and, in so doing, ensures that the corresponding occupancy of the magazine is admissible. After termination of the heuristic, it may be the case that the remaining tools 125 can longer be accommodated in the tool magazine 110 so as to result in a admissible occupancy of the tool magazine 110 with all tools 125. In particular in the case of full tool magazines 110 and in the case of tools 125 which can be allocated only to a small number of particular spaces 135, the partial occupancy of the magazine determined by the heuristic can often no longer be expanded to give an admissible complete magazine occupancy. If the tool magazine 110 comprises a rack magazine, it is commonly the intention for a large number of different tools 125 to be placed in the tool magazine 110, such that a high degree of filling of the tool magazine 110 is common.

There are different possibilities for adapting a heuristic as presented herein to this situation. For example, the heuristic may be supplemented by a search, for example backtracking. Owing to the high degree of symmetry in the placement possibilities for tools 125, it may be necessary to greatly restrict the search range in order to continue to keep the runtime of the method short.

Alternatively, the heuristic may take the remaining tools 125 into consideration already in the determination of the partial occupancy. In other words, the heuristic may continue to successively place the critical tools 125, but ensures, in the case of every placement, that an admissible expansion to a complete magazine occupancy exists.

We will, in a further embodiment, pursue the latter approach and expand the partial occupancy of the tool magazine 110 determined by the heuristic to include a supplementary partial occupancy of the tools 125 that have not yet been placed. The supplementary occupancy serves, for the heuristic, as a guarantor that the previously determined partial occupancy allows an expansion to an admissible complete occupancy of the tool magazine 110. In this way, the algorithm can, in every iteration, have an admissible magazine occupancy of all tools.

The reconstruction of the guarantor should be performed in resource-saving fashion, because the heuristic calls upon this very frequently. The reconstruction is therefore performed in a three-stage escalation procedure. If the reconstruction in one stage is not successful, then it can be attempted to achieve the reconstruction with the aid of the next stage. In every stage, the outlay for achieving the reconstruction increases. If no step is successful, then feedback indicating an inadmissible resource situation can be given.

The space allocation heuristic may consider the selected spaces as inadmissible and continue to search for suitable spaces for the critical tool triplet r to be placed. The three stages use different approaches for the reconstruction:

1. Space exchange: it is attempted to exchange the previous spaces 135 of all tools 125 which are to be relocated as a minimum.
2. Best-fit placement: more than only the tools 125 which are to be relocated as a minimum are removed. With a best-fit strategy, the removed tools 125 are placed in free spaces 135 of the tool magazine 110.
3. Integer program: as in the preceding step, multiple tools 125 are removed from the occupancy. Said tools are newly placed using a mixed-integer program.

The proposed stages in detail:

1. Space Exchange

In the first stage, it is attempted to determine the guarantor (supplementary occupancy of the tool magazine 110) with minimal changes from the previous guarantor. The space allocation heuristic successively places in each case one tool triplet r, wherein at least one of the tools of r has not yet been assigned to a final space; $\bar{r} \neq \emptyset$. Tool(s) $\bar{r}$ may, in their allocated spaces 135, inadmissibly overlap tools 125 from the previous guarantor (without $\bar{r}$). If all tools 125 which overlap with $\bar{r}$ are removed from the previous guarantor (adjacent-space consideration), then the reduced guarantor is admissible but is no longer complete. The removed tools 125 are now placed in the spaces 135 previously used by $\bar{r}$ in the guarantor. If this is not possible, then the space exchange has failed.

2. Best-Fit Placement

If the first stage fails, then the previous spaces of $\bar{r}$ in the guarantor offer too little margin to accommodate the overlapping tools 125. There may be various causes for this, for example because insufficient space is available owing to the adjacent-space consideration, or because not all overlapping tools 125 are admissible in the previous spaces 135 of $\bar{r}$. In the second stage, it is therefore the case, in an embodiment, that the possibilities for the assignment of new spaces 135 for tools 125 from the guarantor are expanded. Not only the overlapping tools 125 but also all tools 125 from a suitable vicinity, both in the newly assigned spaces 135 and in the previous spaces of $\bar{r}$ in the guarantor, are removed. A suitable vicinity is for example the entire column. The removed tools 125 are then newly placed for the guarantor.

An algorithm for this can be written as follows in pseudo-code:

```
Input: F ⊂ W × L // fixed assignment, W̃ ⊂ W tools to be placed;
Output: group of tools from W̃ or ∅ ;
G <- group tools from W̃ ; non-distinguishable with respect to placement;
sort G with respect to decreasing fraction of remaining in the tool magazine 110;
placement = ∅ ;
forall g ∈ G do
    P <- placeGroup(g);
    if P=∅ then
        return ∅ ;
    fi;
    placement <- placement∪P
```

```
end;
return placement;
Function placeGroup(g)
    S <- collect successive free spaces p into segments;
    sort S;
    assign tools from g to successive segments;
    if success then
        return placement;
    end;
    // no admissible placement found
    return ∅ ;
end;
```

The reconstruction algorithm outlined above initially groups the tools 125 into groups of equivalent tools 125 with respect to their placement possibilities; the tools 125 have the same space requirement, the same admissible magazine spaces etc. The sequence in which the tools 125 from a group are placed is irrelevant with regard to admissibility. The groups are sorted by their relative flexibility with respect to the possible space allocations. If, for example, there are only exactly as many admissible spaces 135 for a group as there are tools 125 in the group, then this group has the maximum degree of inflexibility; only the exact space assignment can be permutated. The groups are processed successively with increasing flexibility.

For each group, a decision must be taken as to which spaces 135 are allocated to the tools 125 of the group. In particular in the case of oversized tools 125 or in the case of tools 125 which, in addition to one or more spaces 135, also take up one or more half spaces 135, good utilization of the spaces 135 must be ensured. For this purpose, segments of coherent spaces 135 of the tool magazine 110 may be determined. For a group, the spaces 135 may furthermore be selected in accordance with a best-fit method. For example, the tools 125 that additionally take up in each case one or more half spaces 135 should where possible be placed adjacent to one another, because then two tools can half-occupy one space 135 of the tool magazine 110 without colliding.

3. Mixed-Integer Program

In the seldom occurring case that the first two stages are unsuccessful, then in a final stage, the admissibility may be checked with the aid of a mixed-integer program (also: "mixed integer programming", MIP).

The aim of this mixed-integer program is to maximize the number of placed tools 125. If the optimum target function value is lower than the number of tools 125 to be newly placed, then there is no admissible space assignment for all tools 125. In this case, the reconstruction of the guarantor is considered to have failed, and the space selection is rejected as being inadmissible on the basis of the resource limitations.

Results

Figure 8:
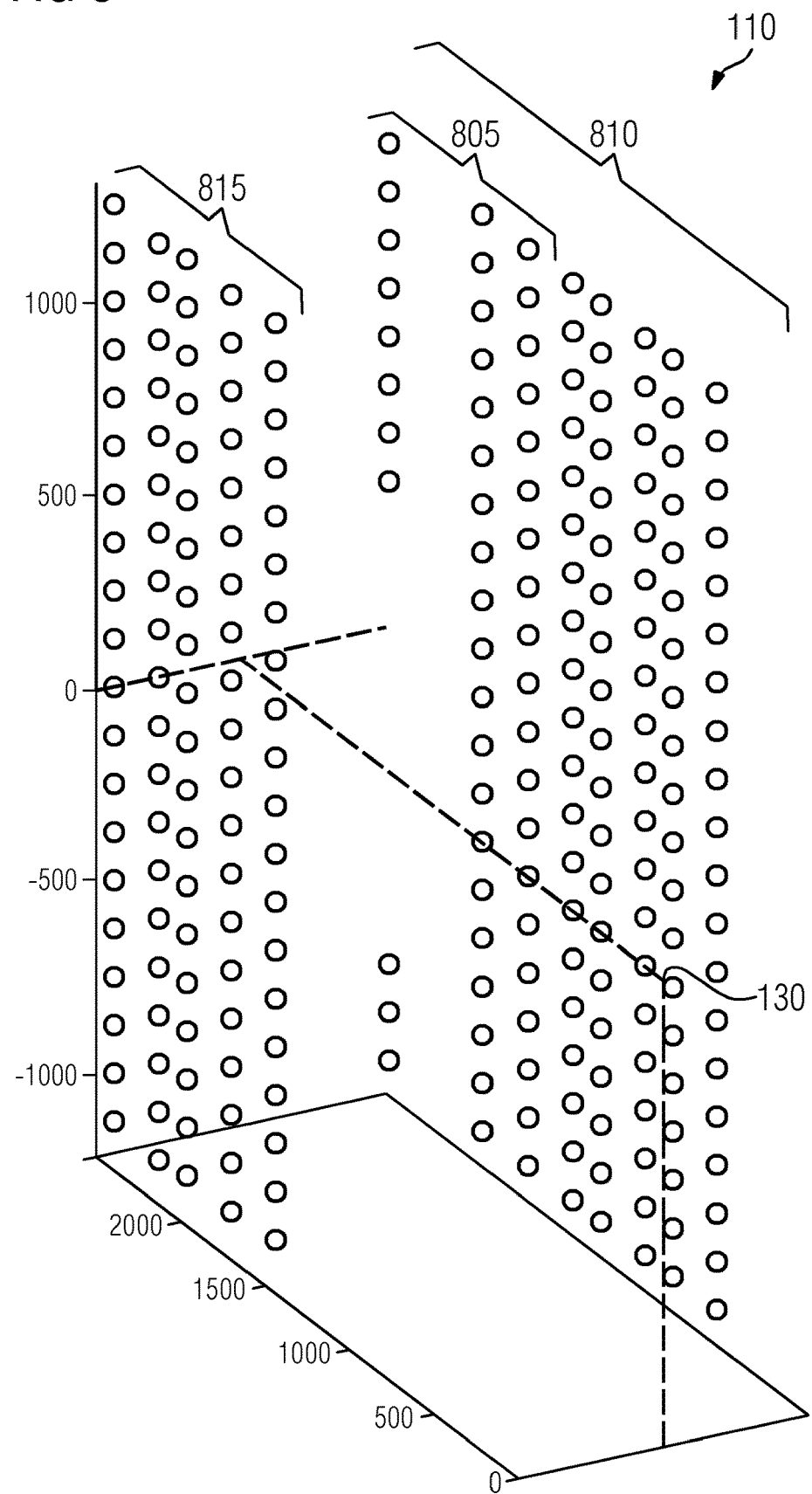
FIG. 8 shows an occupancy of an exemplary tool magazine with tools.

FIG. 8 shows an exemplary specific rack magazine 110 with 251 magazine spaces 135, on which the heuristic described herein was tested by way of example. The spaces 135 are distributed across 13 columns, of which only three columns 805 are admissible for particularly heavy tools 125. A right-hand side 810 with eight magazine columns is the main side, and a left-hand side 815 with five magazine columns is the opposite side. For access to the opposite side 815, the feeder 115 must rotate about a vertical axis, and possibly rotate back again after such access. The illustrated coordinate axes are exemplary. The transfer point 130 for the machine tool 105 is situated approximately at the midpoint of the height between the main side 810 and the opposite side 815 and in this case is illustrated at the coordinates (0, 0, 400).

Figures 9, 9A:
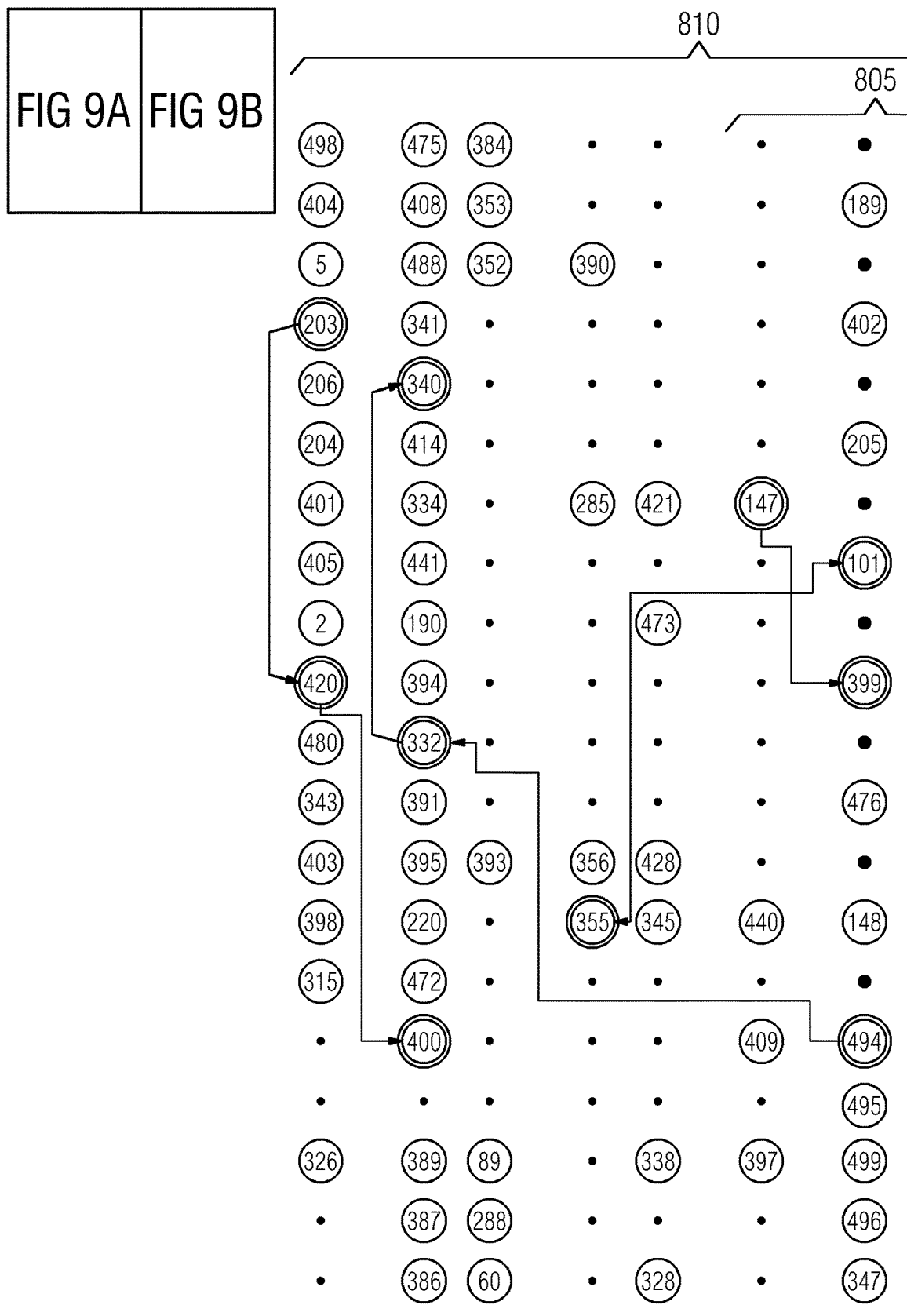
FIG. 9 shows an exemplary starting arrangement of tools in the tool magazine of FIG. 8.
FIG. 9A shows an exemplary starting arrangement of tools in the tool magazine of FIG. 8.
Figure 9B:
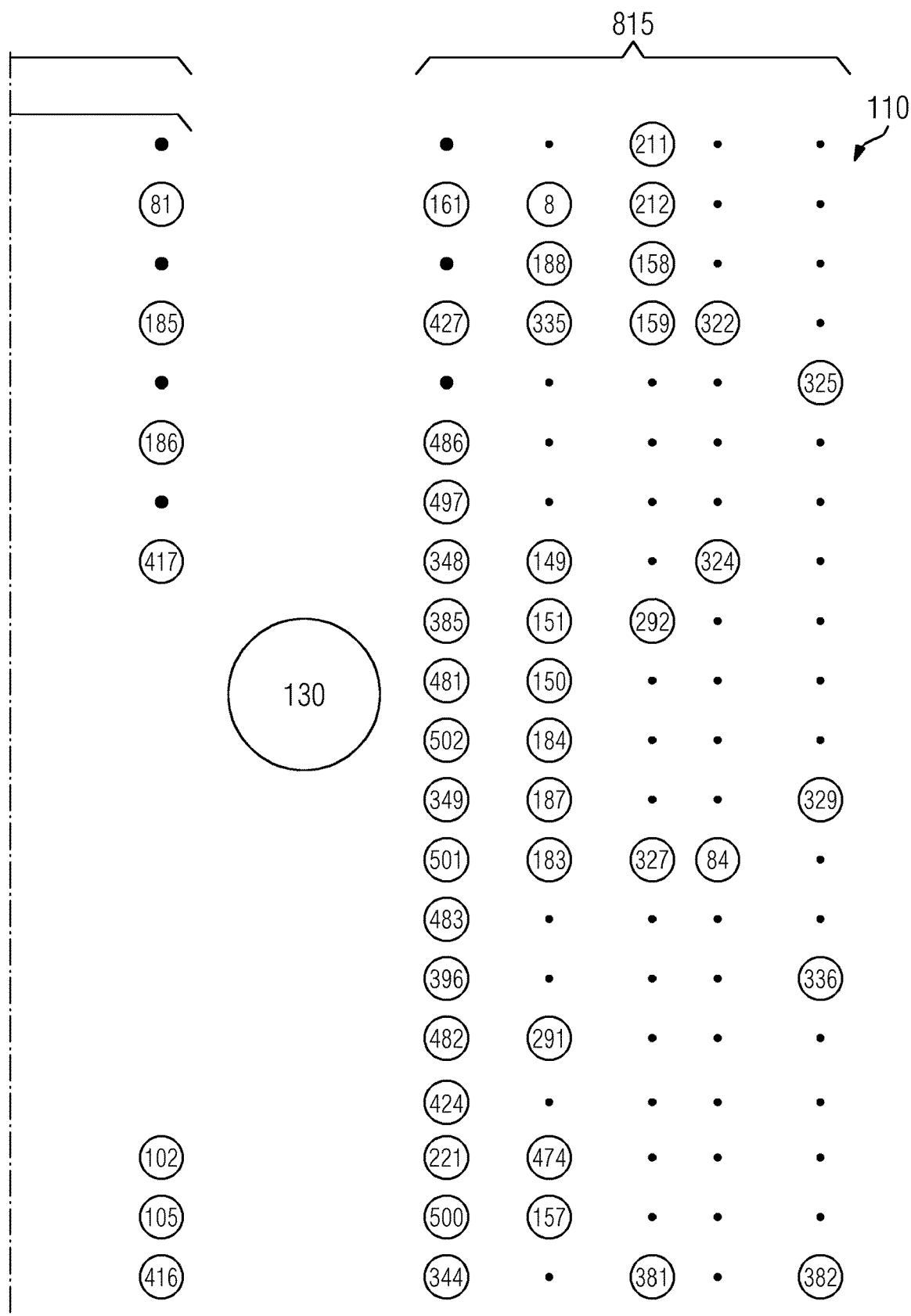
FIG. 9B shows an exemplary starting arrangement of tools in the tool magazine of FIG. 8.

FIG. 9 shows an exemplary starting arrangement of the tool magazine 110 from FIG. 8. The tool magazine 110 is, for the sake of clarity, illustrated schematically in two-dimensional form, but true to scale in each side, the main side 810 on the left and the opposite side on the right. The transfer point 130 for the feeder 115 is situated in this case at (0, 0). 815.

Figures 10, 10A:
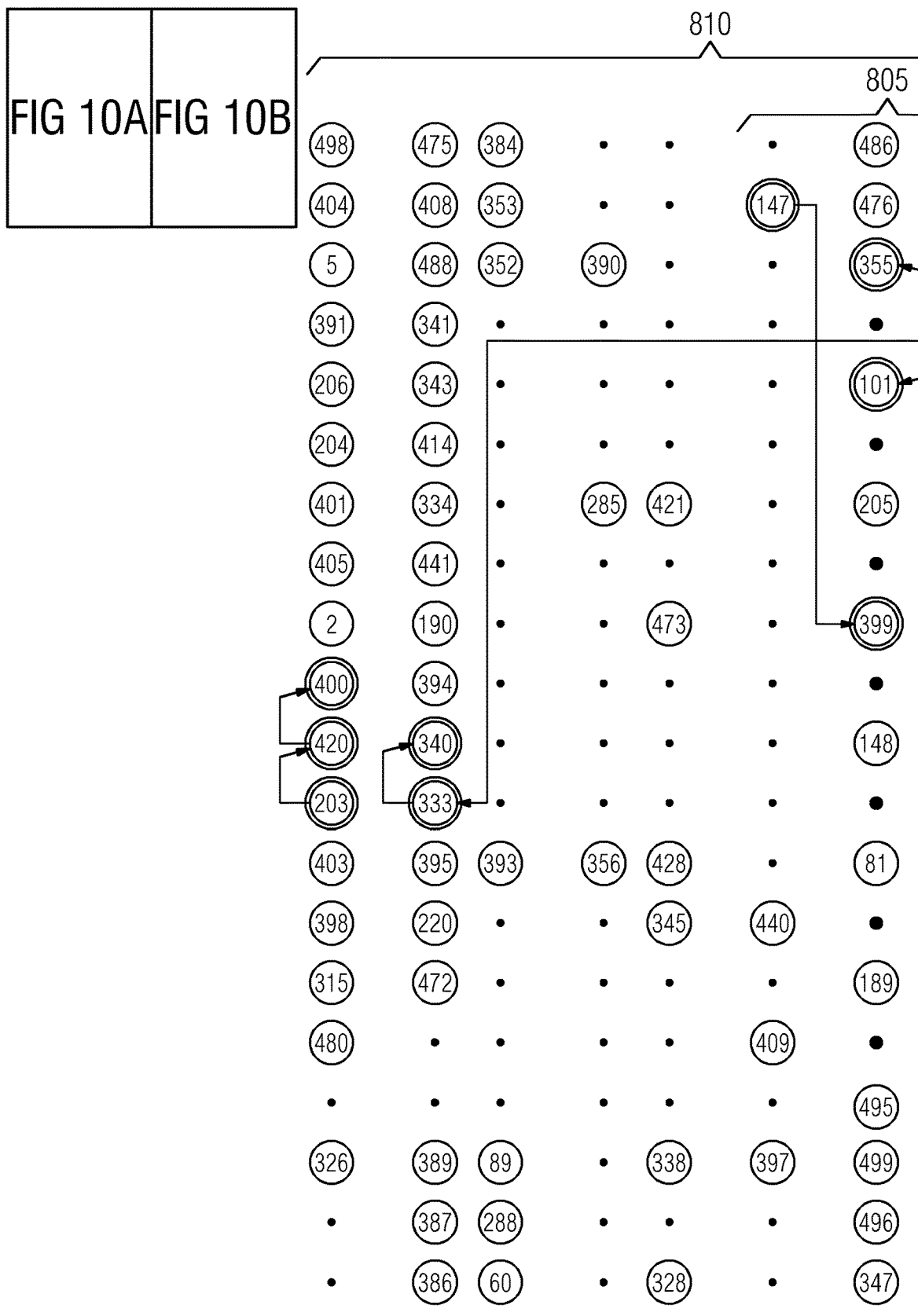
FIG. 10 shows a final arrangement of tools in the tool magazine of FIG. 8.
FIG. 10A shows a final arrangement of tools in the tool magazine of FIG. 8.
Figure 10B:
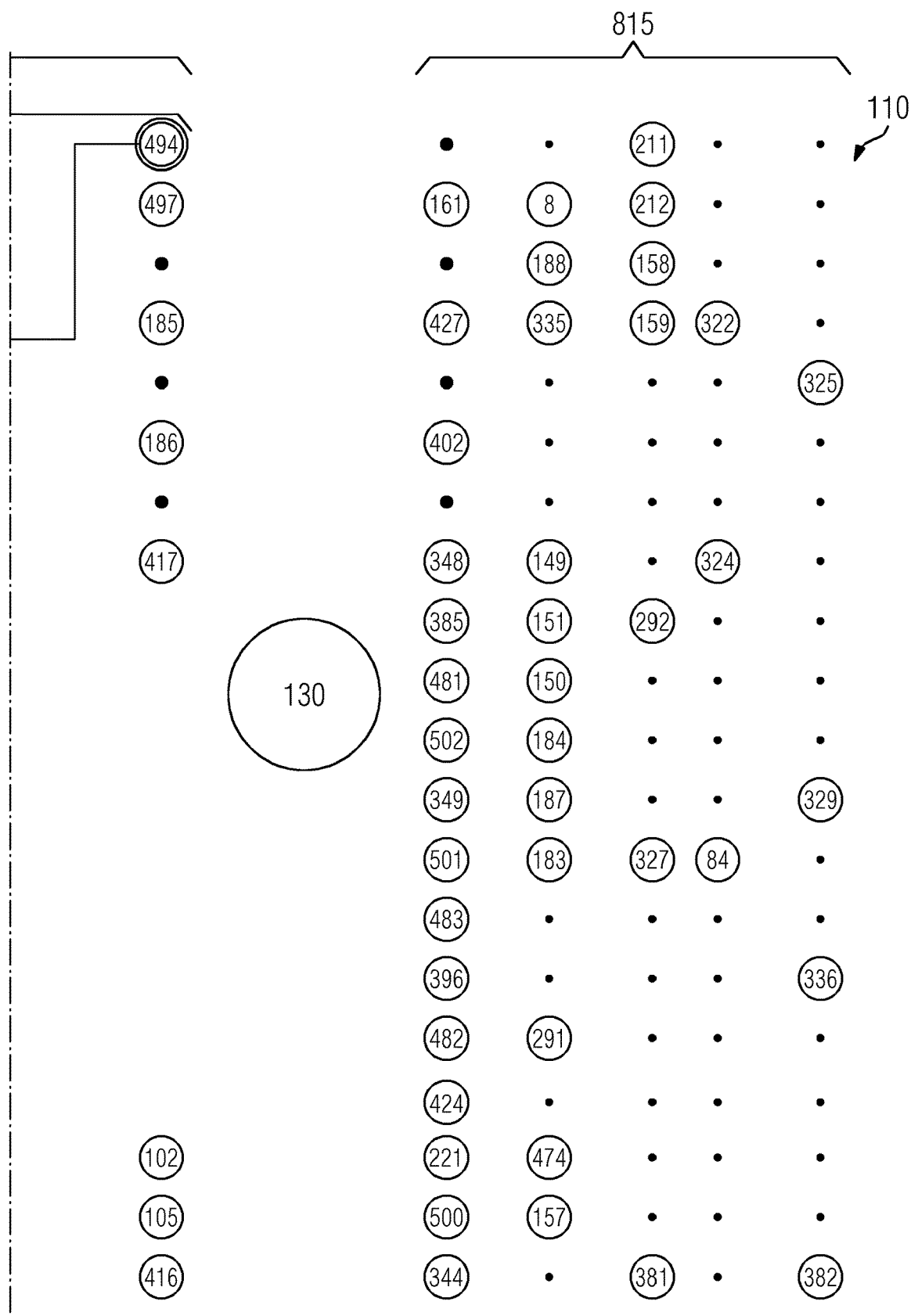
FIG. 10B shows a final arrangement of tools in the tool magazine of FIG. 8.

The numbers here represent in each case an identification number (ID) of a tool 125 fitted at a position 135. If the number is illustrated in a doubly bordered circle, then the tool 125 arises in a critical tool triplet r; otherwise, the number has a single border. Connecting arrows mark the sequence of the tools 125 in a critical tool triplet r. In FIGS. 9 and 10, all of the tools w bear an identification number, which is denoted in the following text by a "#" prefix.

The algorithm firstly determines the critical tool triplets r from the given working steps s. In the present case, there are seven critical tool triplets r: (#101, #355), (#355, #101), (#147, #399), (#203, #420), (#333, #340), (#420, #400), (#494, #333). One of the tool pairs $w_1$, $w_3$ arises in the critical triplets r in both possible sequences: (#101, #355), (#355, #101).

The relevances of the critical triplets are determined: rel(#101, #355)=9, rel(#147, #399)=6, rel(#203, #420)=8, rel(#333, #340)=3, rel(#355, #101)=9, rel(#420, #400)=8, rel(#494, #333)=1. Again, in each case only the tools $w_1$ and $w_3$ to be moved are indicated for the triplet in this notation.

Thereafter, the tool triplet r with the highest relevance is placed, in this case the triplet (#101, #355) with relevance 9. The relevances are updated, and the next triplet r with the highest relevance is placed. The triplets (#203, #420), (#147, #399), (#420, #400), (#333, #340), (#494, #333) and (#355, #101) are selected in succession in this way, and, for the tool(s) 125 that has/have not yet been placed, a space 135 with a minimum exchange time is ascertained.

FIG. 10 shows a final occupancy of the tool magazine 110 determined by the heuristic. It can be very clearly seen that the tools 125 from critical triplets r are set down, where possible, in spaces 135 close to the transfer point 130. The tools #101, #399 and #494 can however be set down only in the three middle columns 805 for heavy tools 125. For these tools 125, the tools 125 associated therewith in a critical triplet are placed closer to the columns for heavy tools 125.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for assigning tools $w_i$ to spaces $p_i$ in a tool magazine, wherein the tool magazine is configured to hold ready a number of tools $w_i$ for a machine tool, wherein the tool magazine comprises a feeder for conveying tools $w_i$; wherein the method comprises the following steps:
acquiring a sequence (S) of planned working steps $s_i$ of the machine tool;
wherein each working step $s_i$ is assigned a tool $w_i$, by means of which the machine tool carries out the working step $s_i$, and a processing time $t_i$, during which the tool $w_i$ is used by the machine tool,
wherein, before the working step $s_i$, the feeder conveys the tool $w_i$ from its assigned space $p_i$ in the tool magazine to a transfer point,
where said tool is picked up by the machine tool,
wherein, after the working step $s_i$, the tool $w_i$ is set down by the machine tool,
from where said tool is conveyed to its assigned space $p_i$ in the tool magazine by the feeder;
wherein each space $p_i$ is assigned a time bi that the feeder requires to convey a tool $w_i$ from the space $p_i$ to the transfer point or vice versa;
the method further comprising the following steps:
determining a maximum cycle time that the feeder requires to convey a tool $w_{i-1}$ of a working step $s_{i-1}$ that has been performed from the transfer point to its assigned space $p_{1-1}$, to move from there to the space $p_{i+1}$ of the tool $w_{i+1}$ of an impending working step $s_{i+1}$, and to convey the tool $w_{i+1}$ from there to the transfer point;
determining a set M with all triplets $r_i$ of successive working steps $s_{i-1}$, $s_i$, $s_{i+1}$ in the case of which the processing time $t_i$ of the working step $s_i$ is shorter than the maximum cycle time;
(a) determining relevances of the triplet $r_i$ of the set M, wherein the relevance of a triplet $r_i$ comprises a number of movements or conveying actions that are defined as the tool $w_{i-1}$ is assigned to a space $p_{i-1}$ and the tool $w_{i+1}$ is assigned to a space $p_{i+1}$;
(b) determining a triplet of the set M with the highest relevance;
(c) assigning a tool $w_1$ of the determined triplet to a space $p_1$ and/or a tool $w_3$ of the determined triplet to a space $p_3$ such that a processing time $t_2$ is longer than, or is shorter to the least possible extent than, the sum of the times required for conveying the tool $w_1$ from the transfer point to the space $p_1$, for moving the feeder from there to the space $p_3$ and for conveying the tool $w_3$ from there to the transfer point;
(d) removing the determined triplet from the set M;
repeating steps (a) to (d) until the set M is empty; and
assigning unassigned tools $w_i$ to unassigned spaces $p_i$ of the tool magazine.

2. The method as claimed in claim 1, wherein the relevance is determined only with respect to working steps $s_j$ that are encompassed by a triplet $r_i$ of the set M.

3. The method as claimed in claim 1, wherein each space $p_i$ is assigned a first time $b_{i1}$, which the feeder requires to convey a tool $w_i$ from the space $p_i$ to the transfer point, and a second time $b_{i2}$, which the feeder requires to convey a tool $w_i$ from the transfer point to the space $p_i$; and wherein both times are taken into consideration in step (c).

4. The method as claimed in claim 1, wherein the time $b_i$ of a space $p_i$ is also determined with respect to a tool $w_i$ assigned to the space $p_i$.

5. The method as claimed in claim 1, wherein an assignment in step (c) is performed such that, thereafter, all unassigned tools is allocated to an admissible space.

6. The method as claimed in claim 5, wherein, in step (c), an assignment is performed only if a guarantor is formed that comprises an admissible assignment of all unassigned tools to free spaces.

7. The method as claimed in claim 6, wherein the determination of the guarantor comprises an interchanging of tools that are assigned to spaces in the guarantor.

8. The method as claimed in claim 6, wherein the determination of the guarantor comprises an assignment of tools to spaces by means of a best-fit strategy.

9. The method as claimed in claim 6, wherein the determination of the guarantor comprises an assignment of tools to spaces by means of a mixed-integer program.

10. The method as claimed in claim 6, wherein the guarantor is determined by an assignment of tools to spaces by means of a best-fit strategy if its determination comprises an interchanging of tools that are assigned to spaces in the guarantor fails; and is determined wherein the determination of the guarantor comprises an assignment of tools to spaces by means of a mixed-integer program if the determination of the guarantor comprises an assignment of tools to spaces by means of a best-fit strategy fails.

11. A device for assigning tools to spaces in a tool magazine, wherein the device is configured to carry out the method as claimed in claim 1.

12. The device as claimed in claim 11, wherein the device is configured to control a conveyance of tools which are required for executing the sequence to assigned spaces.

13. A system comprising a machine tool and the device as claimed in claim 11, wherein the device is configured to control the machine tool in order to carry out the working steps of the sequence.

* * * * *